US012748625B2

(12) United States Patent
Chajdas et al.

(10) Patent No.: US 12,748,625 B2
(45) Date of Patent: Sep. 29, 2026

(54) LOCAL LAUNCH IN WORKGROUP PROCESSORS

(71) Applicant: ADVANCED MICRO DEVICES, INC., Santa Clara, CA (US)

(72) Inventors: Matthaeus G. Chajdas, Munich (DE); Christopher J. Brennan, Boxborough, MA (US); Michael Mantor, Orlando, FL (US); Dominik Joerg Baumeister, Munich (DE); Fabian Robert Sebastian Wildgrube, Mönkeberg (DE); Nicolai Haehnle, Munich (DE); Randy Ramsey, Orlando, FL (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 18/401,449

(22) Filed: Dec. 30, 2023

(65) Prior Publication Data

US 2025/0217195 A1 Jul. 3, 2025

(51) Int. Cl.
*G06F 9/50* (2006.01)
*G06F 9/54* (2006.01)

(52) U.S. Cl.
CPC .............. *G06F 9/5027* (2013.01); *G06F 9/54* (2013.01); *G06F 2209/5018* (2013.01); *G06F 2209/543* (2013.01)

(58) Field of Classification Search
CPC .... G06F 9/3851; G06F 9/3888; G06F 9/4881; G06F 9/505; G06F 9/5005; G06F 9/5027; G06T 1/20
See application file for complete search history.

(56) References Cited

U.S. PATENT DOCUMENTS

| | | | |
|---|---|---|---|
| 5,202,991 | A | 4/1993 | Gamache et al. |
| 5,390,324 | A | 2/1995 | Burckhartt et al. |
| 5,611,042 | A | 3/1997 | Lordi |
| 5,987,628 | A | 11/1999 | Von Bokern et al. |

(Continued)

FOREIGN PATENT DOCUMENTS

| | | |
|---|---|---|
| CN | 105513117 | 4/2016 |
| EP | 3594905 | 11/2022 |

(Continued)

OTHER PUBLICATIONS

Extended European Search Report mailed Dec. 18, 2024 for EP22781816.8, 9 pages.

(Continued)

*Primary Examiner* — Jacob Petranek

(57) ABSTRACT

Workgroup processors associated with a shader program interface are provided with local launchers capable of launching shader threads partially or completely independently from the shader program interface. The local launchers maintain local queues separately from the shader program interface. The local launchers allocate resources for shader thread execution at an associated workgroup processor either directly or through a request to the shader program interface. In some implementations, the shader program interface leases resources to the local launcher in response to a request for resources and terminates the lease when the local launcher notifies the shader program interface that execution of the shader thread is complete.

20 Claims, 6 Drawing Sheets

(56) References Cited

U.S. PATENT DOCUMENTS

| | | | | |
|---|---|---|---|---|
| 6,446,145 | B1 | 9/2002 | Har et al. | |
| 7,447,873 | B1 | 11/2008 | Nordquist | |
| 7,477,073 | B1 | 1/2009 | Tuan et al. | |
| 7,594,095 | B1 | 9/2009 | Nordquist | |
| 8,760,460 | B1 | 6/2014 | Kilgariff et al. | |
| 9,442,780 | B2 | 9/2016 | Gruber | |
| 9,965,321 | B2 | 5/2018 | Duluk, Jr. et al. | |
| 10,153,046 | B1 | 12/2018 | Agarwal et al. | |
| 11,710,207 | B2 | 7/2023 | Brennan et al. | |
| 2008/0195902 | A1 | 8/2008 | Astigarraga et al. | |
| 2008/0320366 | A1 | 12/2008 | Lin | |
| 2010/0125444 | A1 | 5/2010 | Arya et al. | |
| 2011/0154346 | A1 | 6/2011 | Jula | |
| 2012/0017062 | A1 | 1/2012 | Goel et al. | |
| 2013/0021360 | A1 | 1/2013 | Gruber | |
| 2014/0095947 | A1 | 4/2014 | Mozak et al. | |
| 2015/0055406 | A1 | 2/2015 | Andre | |
| 2016/0093069 | A1* | 3/2016 | Maiyuran | G06T 1/60 345/505 |
| 2016/0364343 | A1 | 12/2016 | Case et al. | |
| 2017/0091893 | A1* | 3/2017 | Bhiravabhatla | G06T 1/60 |
| 2017/0372506 | A1 | 12/2017 | Surti | |
| 2019/0236749 | A1 | 8/2019 | Gould et al. | |
| 2019/0371041 | A1 | 12/2019 | Jin et al. | |
| 2020/0089528 | A1 | 3/2020 | Gutierrez et al. | |
| 2020/0117988 | A1* | 4/2020 | Arthur | G06N 3/063 |
| 2020/0167985 | A1 | 5/2020 | Brennan | |
| 2020/0193697 | A1 | 6/2020 | Brennan | |
| 2020/0193703 | A1 | 6/2020 | Favela et al. | |
| 2021/0311785 | A1* | 10/2021 | Castinado | G06F 9/5005 |
| 2022/0091880 | A1 | 3/2022 | Dutu et al. | |
| 2022/0121474 | A1 | 4/2022 | Brewer | |
| 2022/0188965 | A1* | 6/2022 | Li | G06F 9/4881 |
| 2022/0206838 | A1 | 6/2022 | Luo et al. | |
| 2022/0291952 | A1* | 9/2022 | Milojicic | G06F 9/5005 |
| 2022/0308884 | A1 | 9/2022 | Oygard et al. | |
| 2023/0109752 | A1* | 4/2023 | Levit-Gurevich | G06F 11/3409 717/128 |
| 2023/0195471 | A1* | 6/2023 | Millar | G06F 9/3877 712/22 |

FOREIGN PATENT DOCUMENTS

| | | |
|---|---|---|
| KR | 10-2014-0101384 | 8/2014 |
| KR | 10-2023-0125231 A | 8/2023 |

OTHER PUBLICATIONS

Office Action issued in Chinese Application No. 20218004587.7, mailed Jul. 19, 2024, 5 pages.

U.S. Appl. No. 18/434,319, filed Feb. 6, 2024 listing Christopher J. Brennan et al. as inventors, entitled “Wave Throttling Based on a Parameter Buffer”.

Non-Final Office Action mailed Dec. 18, 2024 for U.S. Appl. No. 18/389,056, 21 pages.

Office Action issued in U.S. Appl. No. 18/434,319, mailed Sep. 11, 2024, 42 pages.

Extended European Search Report mailed May 13, 2024 for EP21907609.8, 16 pages.

Extended European Search Report mailed Jun. 11, 2024 for EP21907447.3, 18 pages.

International Search Report and Written Opinion issued in Application No. PCT/US2024/034000, mailed Oct. 2, 2024 8 pages.

Non-Final Office Action mailed Mar. 28, 2025 for U.S. Appl. No. 18/389,056, 42 pages.

Final Office Action mailed Apr. 3, 2025 for U.S. Appl. No. 18/434,319, 48 pages.

Notice of Allowance mailed Jan. 20, 2026 for U.S. Appl. No. 18/434,319, 13 pages.

Final Office Action mailed Oct. 24, 2025 for U.S. Appl. No. 18/389,056, 22 pages.

Japanese Office Action mailed Aug. 26, 2025 for Application No. 2023-535353, 6 pages.

European Office Action mailed Sep. 26, 2025 for EP22781816.8, 9 pages.

Non-Final Office Action mailed Jul. 3, 2025 for U.S. Appl. No. 18/389,056, 22 pages.

Non-Final Office Action mailed Aug. 13, 2025 for U.S. Appl. No. 18/434,319, 20 pages.

Japanese Office Action mailed Nov. 18, 2025 for Application No. 2023-556932, 4 pages.

* cited by examiner

LOCAL LAUNCH IN WORKGROUP PROCESSORS

BACKGROUND

Parallel processors such as accelerator processors and graphics processing units (GPUs) implement graphics processing pipelines that concurrently process copies of commands that are retrieved from a command buffer. GPUs and other multithreaded processing units typically implement multiple processing elements (which are also referred to as processor cores, compute units, or workgroup processors) that execute different programs or concurrently execute multiple instances of a single program on multiple data sets as a single "wave," i.e., a group of threads running concurrently on a GPU. A hierarchical execution model is typically used to match the hierarchy implemented in hardware. The execution model defines a kernel of instructions that are executed by one or more waves (also referred to as wavefronts, threads, streams, or work items). The graphics pipeline in a GPU includes one or more shader engines that execute computer programs typically referred to as "shaders" using resources of the graphics pipeline such as compute units, memory, and caches. Shaders are traditionally used for graphical calculations, as implied by their name; however, in modern computing, shaders are often utilized as "compute shaders," which function as general purpose software that is able to perform work separately from a graphics processing pipeline.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
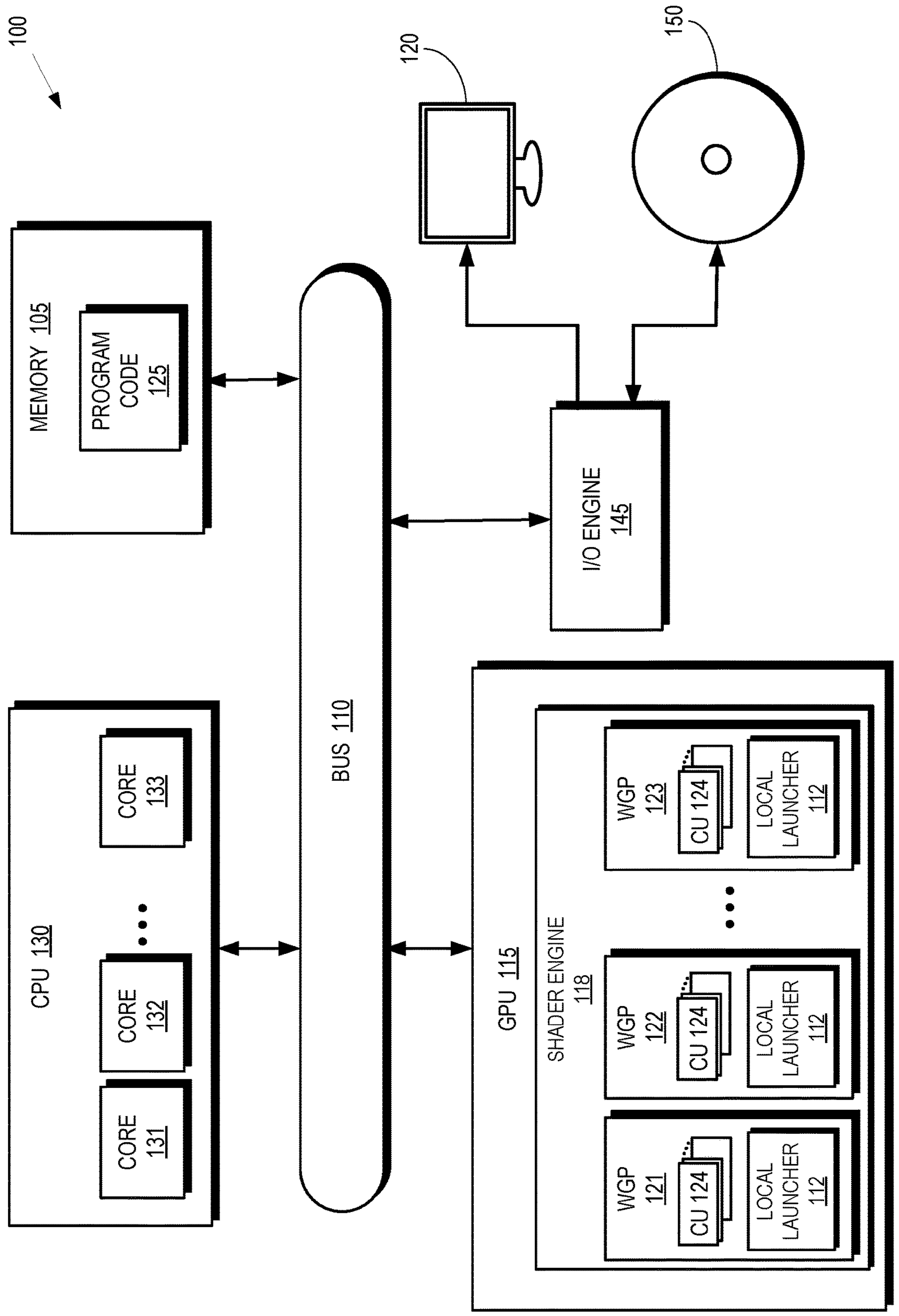
FIG. 1 is a block diagram of a processing system according to some implementations.

A parallel processor such as an accelerated processing device or GPU may include a plurality of shader engines, wherein each shader engine includes a respective quantity of compute units, and a command processor coupled to the plurality of shader engines. Based on one or more commands received for execution, a plurality of workgroups (collections of processing threads) is generated for assignment to the plurality of shader engines for processing. The command processor receives one or more commands for execution and generates the plurality of workgroups based on the one or more commands. Assigning each workgroup to a respective shader engine may include dynamically assigning each workgroup to a respective shader engine via a shader program interface (SPI), which acts as a scheduler among other functions as described hereinbelow, associated with the respective shader engine.

In conventional implementations, the SPI manages the launching of all threads to be executed by a corresponding workgroup processor. Typically, each SPI manages a number of workgroup processors and handles operations such as resource tracking, allocation, and wave setup. As a consequence, the workgroup processor cannot launch threads independently from the SPI. Instead, the workgroup processors need to request that a thread be launched through a command processor, which interfaces with the SPI in order to launch the thread. Commands generated based on the request typically are typically provided to the SPI via the command processor or a related process, e.g., using a special register, and the thread is often executed by a different workgroup processor than the requesting workgroup processor as a result of the SPI managing workload balancing and resource allocation among the workgroup processors. This processing overhead limits the performance characteristics of workgroup processors launching threads. Additionally, conventional mechanisms like take-over mode that implement context switching capabilities take control of one or more workgroup processors, which introduces further difficulties in balancing work between the SPI and the workgroup processors. In order to improve performance in launching threads and overall computing efficiency, implementations disclosed herein enable workgroup processors to launch threads partially or completely independently from the SPI.

FIGS. 1, 2, and 4-6 illustrate systems and techniques for providing local launch capabilities to workgroup processors in a processor such as a GPU. Implementations disclosed herein enable workgroup processors to "self-service" launch requests, when possible, while still allowing the SPI to provide work and manage associated workgroup processors when appropriate. In some implementations, the workgroup processor local launch mechanism provides an order-of-magnitude improvement to thread launch performance, allowing finer-grained dispatches, local consumption of data within a compute unit, and much improved performance in highly variable workloads. For example, the local launch mechanism improves the performance of application program interfaces that utilize work graphs by allowing a workgroup processor to self-schedule work without needing to submit a request to a work scheduling mechanism such as a command processor. Additionally, enabling resources to be allocated by either the local launcher or the SPI allows for better distribution of workloads that use both at the same time, such as graphics functions running concurrently with compute functions.

Providing local launchers in workgroup processors enables the local launcher to handle local dispatches without the overhead associated with conventional launch mechanisms that rely on requests being made to the SPI. In some implementations, the local launcher coordinates with the SPI and manages resources by allocating the resources independently from the SPI, notifying the shader program interface of the allocation, and managing its own local queue of dispatches. In some implementations, a local dispatch queue in a workgroup processor is only accessible and controllable by the workgroup processor. However, in some implementations, one or more of the local launcher, the SPI, the workgroup processor, and the local dispatch queues are addressable or controllable directly by a user, such that the user can granularly implement specific tasks on specific workgroup processors, for example, and manage operation of the SPI in order to optimize for specific operations. In other implementations, users are able to provide a preference or vote for a preferred operation of the local launcher, the SPI, the workgroup processor, and the local dispatch queues, e.g., via a user accessible driver, such that the local launcher and/or SPI is able to override the preference or vote in scenarios where significantly more efficient operation is achievable using a configuration other than that specified by the user's specified preference or vote.

In some implementations, when the workgroup processor needs to launch a thread, it determines the required resources, allocates the resources, and does not return the resources to the SPI until the request can be fulfilled. In other implementations, the workgroup processor requests resources directly from the SPI. As long as the local queue is not empty and the workgroup processor is not idle, the workgroup processor keeps the resources allocated to itself and manages the execution of locally launched threads without needing to communicate directly with the SPI, as the workgroup processor is able to continue processing tasks independently from the SPI. Once the local queue drains, the workgroup processor starts releasing resources back to the SPI. Enabling the workgroup processor to operate independently from the SPI reduces launch latency dramatically in some implementations, allows self-scheduling, and has minimum impact on existing applications, as they are still able to launch work through the SPI as desired. Software that does not use the local launch mechanism is unaffected by the local launch mechanism and continues to run unmodified as the software provides work via the SPI. New software written to take advantage of the local launch mechanism can easily do so, as the total integration cost is a limited number of new opcodes (operation codes, e.g., machine language instructions that specify operations to be performed), and resource management is able to be performed by the hardware.

FIG. 1 is a block diagram of a processing system 100 that implements local launch capabilities according to some implementations. The processing system 100 includes or has access to a memory 105 or other storage component that is implemented using a non-transitory computer readable medium such as a dynamic random-access memory (DRAM). However, in some cases, the memory 105 is implemented using other types of memory including static random-access memory (SRAM), nonvolatile RAM, and the like. The memory 105 is referred to as an external memory since it is implemented external to the processing units implemented in the processing system 100. The processing system 100 also includes a bus 110 to support communication between entities implemented in the processing system 100, such as the memory 105. Some implementations of the processing system 100 include other buses, bridges, switches, routers, and the like, which are not shown in FIG. 1 in the interest of clarity.

The techniques described herein are, in different implementations, employed at any of a variety of parallel processors (e.g., vector processors, GPUs, general-purpose GPUs (GPGPUs), non-scalar processors, highly parallel processors, artificial intelligence (AI) processors, inference engines, machine learning processors, other multithreaded processing units, and the like). FIG. 1 illustrates an example of a parallel processor, and in particular a GPU 115, in accordance with some implementations. The GPU 115 typically renders images for presentation on a display 120. For example, the GPU 115 renders objects to produce values of pixels that are provided to the display 120, which uses the pixel values to display an image that represents the rendered objects. The GPU 115 implements a plurality of shader engines, such as a shader engine 118, each of which includes a plurality of workgroup processors (WGPs) 121, 122, 123 (collectively referred to herein as "WGPs 121-123") that are able to execute instructions separately or in parallel. The shader engine 118 is typically implemented using shared hardware resources of the GPU 115, such as compute units 124. In some implementations, the shader engine 118 is used to implement shaders, such as geometry shaders, pixel shaders, and the like. Generally, the shader engine 118 is a logical grouping of processing hardware, which in some implementations includes, e.g., one or more processors, compute units, processing chiplets, processor cores, and/or caches.

In some implementations, the WGPs 121-123 include one or more single-instruction-multiple-data (SIMD) units, compute units 124, and the like. As shown in FIG. 1, the WGPs 121-123 further include local launchers 112, which are implemented as any cooperating collection of hardware, software, or a combination thereof that performs function and computations associated with launching threads, such as compute shader threads, partially or completely independently from, e.g., an SPI (see, e.g., FIGS. 3 and 4). The number of WGPs 121-123 implemented in the GPU 115 is a matter of design choice and some implementations of the GPU 115 include more or fewer WGPs than shown in FIG. 1. In some implementations, the WGPs 121-123 implement a graphics pipeline, as discussed herein. Generally, the WGPs 121-123 are logical groupings of processing hardware, which in some implementations include, e.g., one or more processors, compute units, processing chiplets, processor cores, and/or caches. In some implementations, the WGPs 121-123 are able to be selectively addressed or controlled independently from one another or addressed or controlled in groups of two or more WGPs such that the GPU 115, the shader engine 118, and/or a user is able to control which WGPs 121-123 perform specific tasks or to distribute tasks across a number of WGPs. In some implementations, the GPU 115 is used for general purpose computing. The GPU 115 executes instructions such as program code 125 stored in the memory 105 and the GPU 115 stores information in the memory 105 such as the results of the executed instructions.

The processing system 100 also includes a central processing unit (CPU) 130 that is connected to the bus 110 and therefore communicates with the GPU 115 and the memory 105 via the bus 110. The CPU 130 implements a plurality of processor cores 131, 132, 133 (collectively referred to herein as "processor cores 131-133") that execute instructions concurrently or in parallel. The number of processor cores 131-133 implemented in the CPU 130 is a matter of design choice and some implementations include more or fewer processor cores than illustrated in FIG. 1. The processor cores 131-133 execute instructions such as program code 125 stored in the memory 105 and the CPU 130 stores information in the memory 105 such as the results of the executed instructions. The CPU 130 is also able to initiate graphics processing by issuing draw calls to the GPU 115. The processor cores 131-133 execute instructions separately or in parallel.

An input/output (I/O) engine 145 handles input or output operations associated with the display 120, as well as other elements of the processing system 100 such as keyboards, mice, printers, external disks, and the like. The I/O engine 145 is coupled to the bus 110 so that the I/O engine 145 communicates with the memory 105, the GPU 115, or the CPU 130. In the illustrated implementation, the I/O engine 145 reads information stored on an external storage component 150, which is implemented using a non-transitory computer readable medium such as a compact disk (CD), a digital video disc (DVD), and the like. The I/O engine 145 is also able to write information to the external storage component 150, such as the results of processing by the GPU 115 or the CPU 130.

The processing system 100 implements pipeline circuitry for executing instructions in multiple stages of a graphics pipeline. The pipeline circuitry is implemented in some implementations of the WGPs 121-123, or the processor cores 131-133, or both. In some implementations, the pipeline circuitry of the WGPs 121-123 is used to implement a graphics pipeline that executes shaders, e.g., program code that renders graphics or performs other tasks, of different types including, but not limited to, vertex shaders, hull shaders, domain shaders, geometry shaders, and pixel shaders. Some implementations of the processing system 100 include one or more caches that hold information written to the caches by the shaders in response to completing execution of waves or wave groups, such as geometry shader wave groups. The information written to the caches is subsequently read out during execution of other waves or wave groups such as pixel shader waves. Some implementations of the geometry shader generate first wave groups and a shader program interface launches the first wave groups for execution by the shaders. A scan converter generates second waves for execution on the shaders based on results of processing the first wave groups the one or more shaders. The first wave groups are selectively throttled based on a comparison of in-flight first wave groups and second waves pending execution on the at least one shader engine. In other implementations, the WGPs 121-123 launch threads partially or completely independently from the SPI using a local launch mechanism, as described further hereinbelow in the discussion of FIGS. 4-6. The cache holds information that is written to the cache in response to the first wave groups finishing execution on the shaders. Information is read from the cache in response to read requests issued by the second waves.

Figure 2:
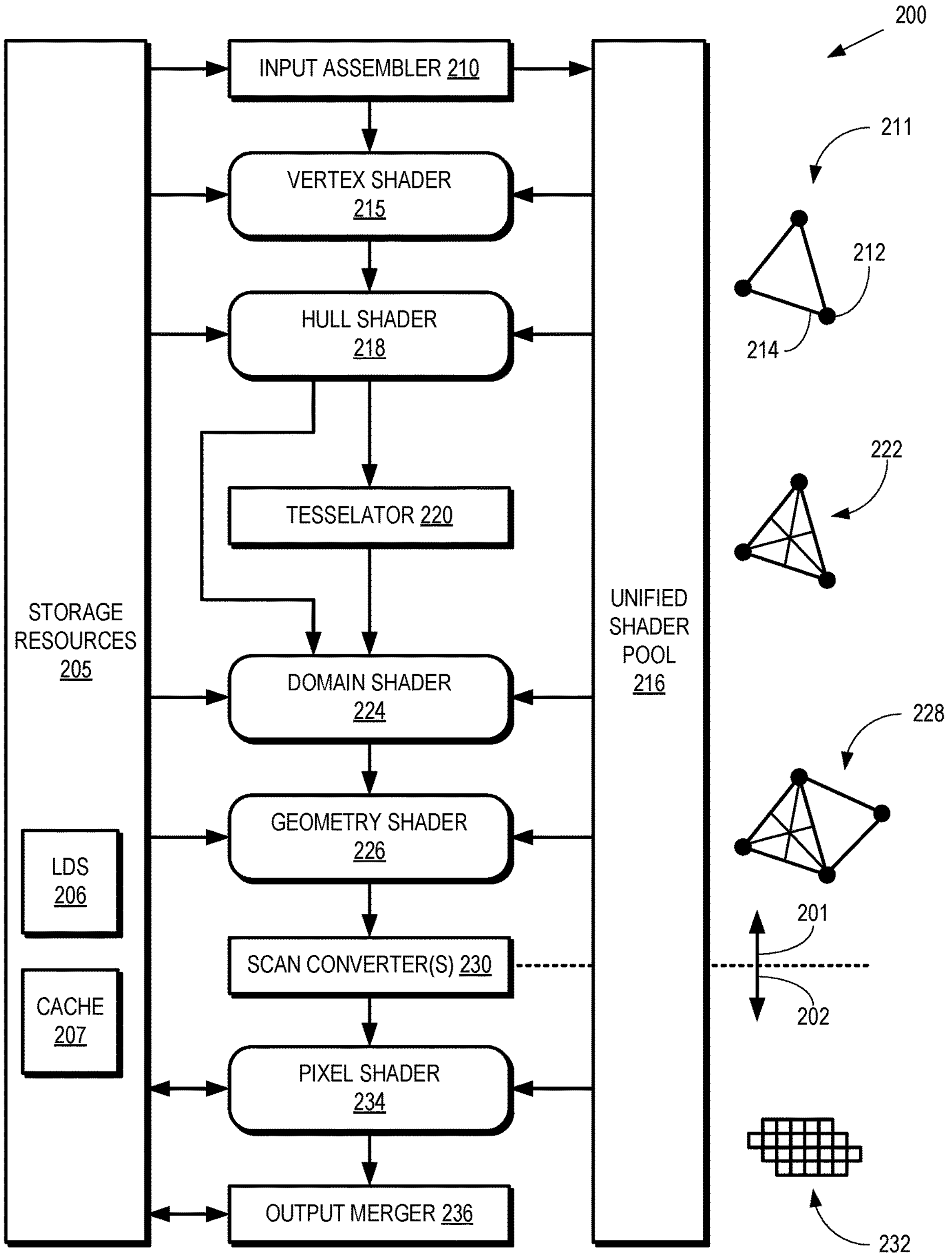
FIG. 2 depicts a graphics pipeline that is capable of processing high-order geometry primitives to generate rasterized images of three-dimensional (3D) scenes at a predetermined resolution according to some implementations.

FIG. 2 depicts a graphics pipeline 200 that is capable of processing high-order geometry primitives to generate rasterized images of three-dimensional (3D) scenes at a predetermined resolution according to some implementations. The graphics pipeline 200 is implemented in some implementations of the processing system 100 shown in FIG. 1. The illustrated implementation of the graphics pipeline 200 is implemented in accordance with the DX11 specification. Other implementations of the graphics pipeline 200 are implemented in accordance with other application programming interfaces (APIs) such as Vulkan, Metal, DX12, and the like. The graphics pipeline 200 is subdivided into a geometry processing portion 201 that includes portions of the graphics pipeline 200 prior to rasterization and a pixel processing portion 202 that includes portions of the graphics pipeline 200 after rasterization.

The graphics pipeline 200 has access to storage resources 205 such as a hierarchy of one or more memories or caches that are used to store buffer data, vertex data, texture data, and the like. In the illustrated implementation, the storage resources 205 include local data share (LDS) 206 circuitry that is used to share data between threads of a workgroup without having to interface with the cache/memory hierarchy. The storage resources 205 also include one or more caches 207 that cache frequently used data. The cache 207 is used to implement a parameter buffer. As discussed herein, waves or wave groups that are executing on the shaders of the graphics pipeline 200 (referred to herein as shader stages or shaders of the graphics pipeline) finish execution by writing results of processing the waves or wave groups into the caches 207. Shaders further down the graphics pipeline 200 can issue read requests to read information from the caches 207, such as the results of processing by waves or wave groups that previously finished execution on the shaders. The storage resources 205 are implemented using some implementations of the system memory 105 shown in FIG. 1.

An input assembler 210 accesses information from the storage resources 205 that is used to define objects that represent portions of a model of a scene. An example of a primitive is shown in FIG. 2 as a triangle 211, although other types of primitives are processed in some implementations of the graphics pipeline 200. The triangle 211 includes one or more vertices 212 that are connected by one or more edges 214. The vertices 212 are shaded during the geometry processing portion 201 of the graphics pipeline 200.

A vertex shader 215, which is implemented in software in the illustrated implementation, logically receives a single vertex 212 of a primitive as input and outputs a single vertex. Some implementations of shaders such as the vertex shader 215 implement massive single instruction multiple data (SIMD) processing at shared massive SIMD compute units so that multiple vertices are processed concurrently. In some implementations, the graphics pipeline 200 implements a unified shader model so that all the shaders included in the graphics pipeline 200 have the same execution platform on the shared massive SIMD compute units. In some implementations, the shaders, including the vertex shader 215, are implemented using a common set of resources that is referred to herein as the unified shader pool 216.

A hull shader 218 operates on input high-order patches or control points that are used to define the input patches. The hull shader 218 outputs tessellation factors and other patch data such as control points of the patches that are processed in the hull shader 218. The tessellation factors are stored in the storage resources 205 so they can be accessed by other entities in the graphics pipeline 200.

A tessellator 220 receives objects (such as patches) from the hull shader 218. In some implementations, primitives generated by the hull shader 218 are provided to the tessellator 220. The tessellator 220 generates information identifying primitives corresponding to the input object, e.g., by tessellating the input objects based on tessellation factors generated by the hull shader 218. Tessellation subdivides input higher-order primitives such as patches into a set of lower-order output primitives that represent finer levels of detail, e.g., as indicated by tessellation factors that specify the granularity of the primitives produced by the tessellation process. A model of a scene is therefore represented by a smaller number of higher-order primitives (to save memory or bandwidth) and additional details are added by tessellating the higher-order primitive.

A domain shader 224 inputs a domain location and (optionally) other patch data. The domain shader 224 operates on the provided information and generates a single vertex for output based on the input domain location and other information. In the illustrated implementation, the domain shader 224 generates primitives 222 based on the triangles 211 and the tessellation factors. The domain shader 224 launches the primitives 222 in response to completing processing.

A geometry shader 226 receives input primitives from the domain shader 224 and outputs up to four primitives (per input primitive) that are generated by the geometry shader 226 based on the input primitive. In the illustrated implementation, the geometry shader 226 generates the output primitives 228 based on the tessellated primitive 222. Some implementations of the geometry shader 226 generate wave groups that are launched by a corresponding SPI in associated WGPs. In other implementations, the WGPs launch threads independently from the SPI, as described further hereinbelow in the discussion of FIGS. 4-6. In response to finishing execution on the shader engines, the wave groups write the output back to the caches 207.

One stream of primitives is provided to one or more scan converters 230 and, in some implementations, up to four streams of primitives are concatenated to buffers in the storage resources 205. The scan converters 230 perform shading operations and other operations such as clipping, perspective dividing, scissoring, and viewport selection, and the like. The scan converters 230 generate a set 232 of pixels that are subsequently processed in the pixel processing portion 202 of the graphics pipeline 200. Some implementations of the scan converters 230 provide requests to read information from the caches 207, e.g., by transmitting the requests to a shader program interface implemented in the graphics pipeline 200.

In the illustrated implementation, a pixel shader 234 inputs a pixel flow (e.g., including the set 232 of pixels) and outputs zero or another pixel flow in response to the input pixel flow. An output merger block 236 performs blend, depth, stencil, or other operations on pixels received from the pixel shader 234. Some or all the shaders in the graphics pipeline 200 perform texture mapping using texture data that is stored in the storage resources 205. For example, the pixel shader 234 can read texture data from the storage resources 205 and use the texture data to shade one or more pixels. The shaded pixels are then provided to a display for presentation to a user.

Figure 3:
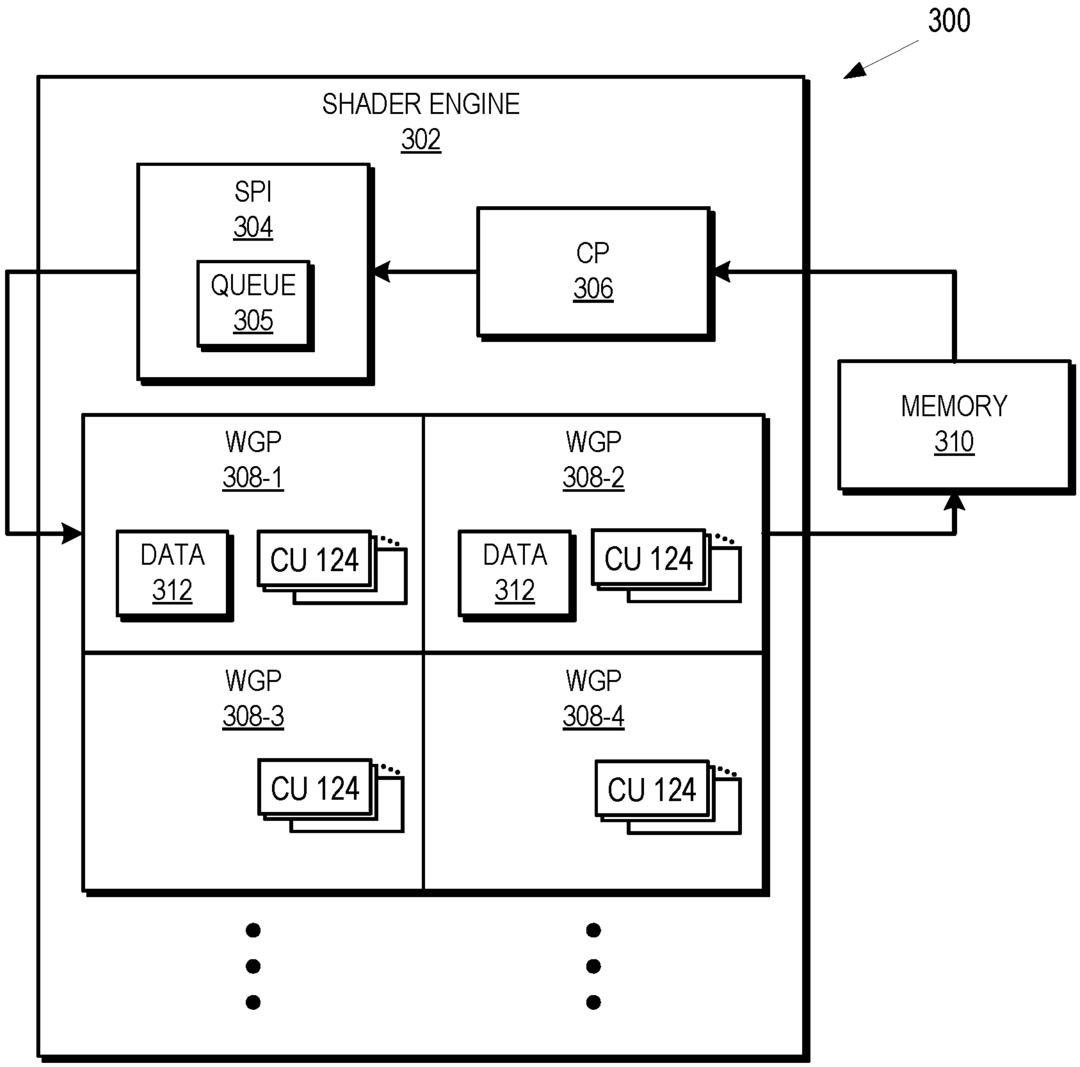
FIG. 3 is a block diagram of a workgroup cluster architecture illustrating steps required to launch a shader thread.

FIG. 3 is a block diagram of a workgroup cluster architecture 300 illustrating steps required to launch a shader thread, i.e., a particular instantiation of a shader that performs a specific task or set of calculations. The workgroup cluster architecture 300 has been used in some implementations of processing systems like the processing system 100 shown in FIG. 1 and graphics pipelines like the graphics pipeline 200 shown in FIG. 2. However, as noted above, aspects of the workgroup cluster architecture 300 limit launch efficiency and overall performance in some situations.

The workgroup cluster architecture 300 includes a shader engine 302, which includes a shader program interface (SPI) 304 that manages a queue 305 of work, such as requests to launch threads, and a command processor (CP) 306 that receives requests, e.g., from one of a number of associated WGPs 308 or from other software or hardware through a memory 310. When a WGP such as WGP 308-2 needs to launch a new thread to execute operations related to data 312 stored in the WGP 308-2, the WGP 308-2 typically must store the request and the data 312 in memory 310 such that the CP 306, which monitors the memory 310 for such requests, registers the request and provides instructions to the SPI 304 to add work associated with the request to its queue 305.

When a WGP, such as WGP 308-1, is available, the SPI 304 assigns the work to the WGP 308-1 and provides the data 312 needed to perform the work. Although interfacing with the SPI 304 to execute complex tasks such as draw calls results in an efficient distribution of corresponding work among the WGPs 308, for more granular operations where a single WGP, such as WGP 308-2, is able to perform the work on its own, the inability of the WGPs 308 to launch threads independently from the SPI 304 results in inefficiencies like those described above due to the roundabout method of launching threads by submitting requests to the SPI 304 via the CP 306 and memory 310, which has a relatively high cost in terms of latency and data movement.

Figure 4:
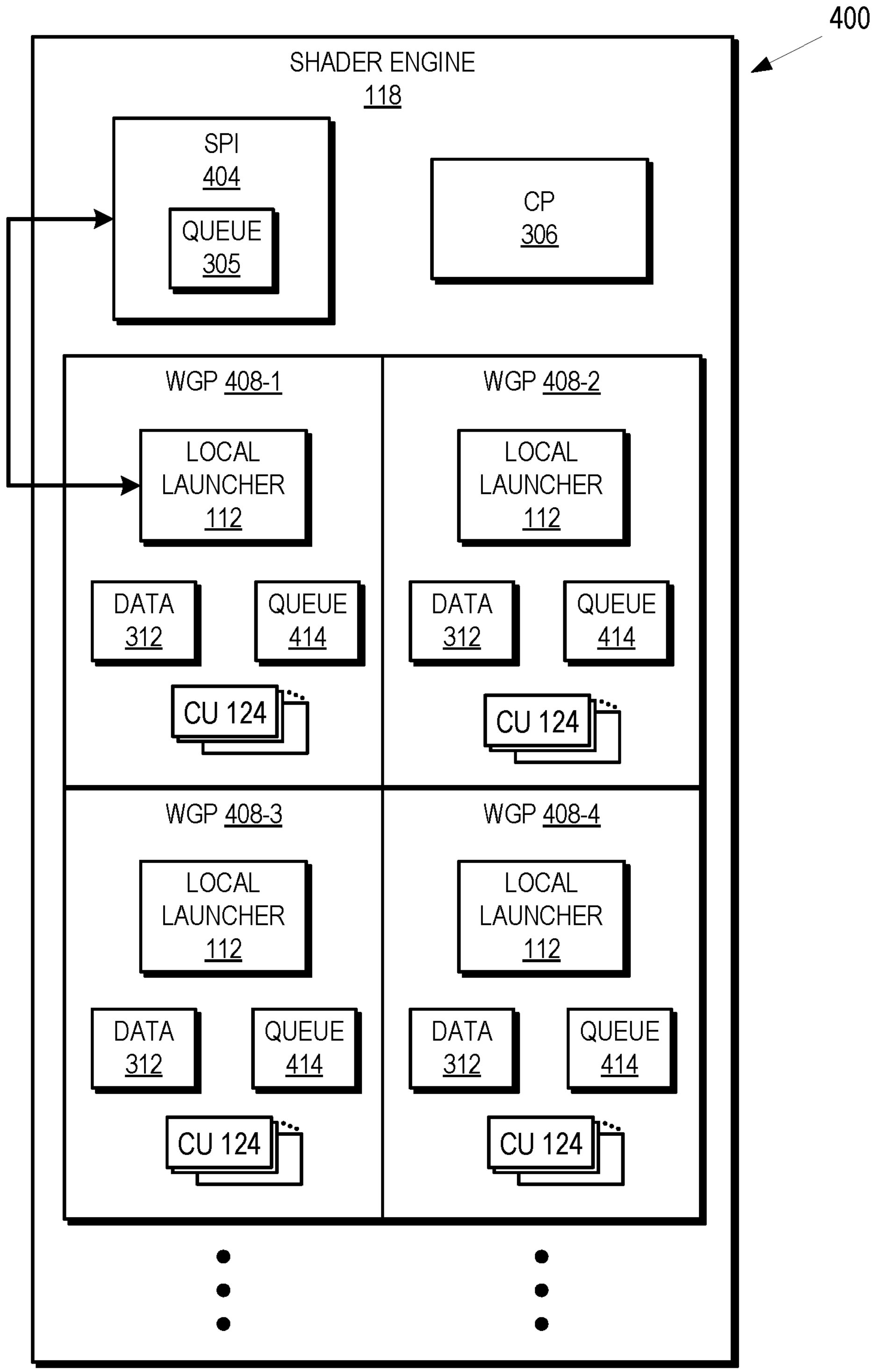
FIG. 4 is a block diagram of a workgroup cluster architecture including workgroup processors having local launchers according to some implementations.

FIG. 4 is a block diagram of a workgroup cluster architecture 400 including WGPs 408-1 to 408-4 having local launchers 112 according to some implementations. The workgroup cluster architecture 400 is implemented in some implementations of the processing system 100 shown in FIG. 1 and the graphics pipeline 200 shown in FIG. 2. As can be seen by comparing FIG. 3 and FIG. 4, the workgroup cluster architecture 400 of FIG. 4 includes many similar components to the workgroup architecture 300 of FIG. 3, such as the shader engine 118, the CP 306, and the SPI 404. However, the WGPs 408 in the workgroup cluster architecture 400 of FIG. 4 include local launch software or circuitry, herein referred to as "local launchers" 112, which are capable of launching threads, such as compute shader threads, partially or completely independently from the SPI 404 and which are able to manage their own local queue 414 of work separately from the SPI queue 305. However, the SPI 404 is still able to distribute work among the WGPs and launch threads as needed in the case of complex operations such as draw calls. Accordingly, while one WGP, such as WGP 408-1 is executing a thread launched by the local launcher at WGP 408-1, the other WGPs, such as WGP 408-2, 408-3, and 408-4, are still able to receive work from the SPI 404 in a conventional fashion. Generally, the local launchers 112 include hardware and/or software configured to receive instructions from a user or another hardware or software component, such as the SPI 404 or shader engine 118, perform tasks such as managing their own local queue 414 of work separately from the SPI queue 305, and communicate with the SPI 404 and/or shader engine 118 to obtain or return resources such as memory, cache, or compute units 124 needed for operation. Accordingly, in some implementations, the local launchers 112 include one or more processors, read only memories, random access memories, queues, I/O engines, drivers, and/or software algorithms that implement aspects of the local launcher 112 as described herein.

Software configured to capitalize on the performance enhancing capabilities provided by the local launchers 112 will typically use particular API calls designed to utilize the local launchers 112, while more complex operations such as draw calls will still be issued to one or more SPIs 404 in a conventional fashion in order to efficiently distribute the workload among a plurality of WGPs 408. In other words, the determination of whether to launch a thread at the local launcher 112 or at an SPI 404 is based on a software indication in an API call in some implementations. In this way, work designed to utilize the local launchers 112 will not interfere with work designed to be spread among the WGPs 408 via the SPI 404. Notably, although four WGPs are illustrated in FIG. 4, more or fewer WGPs are associated with each SPI 404 in different implementations.

As the local launcher 112 is configured to launch a shader thread at one of the WGPs 408, the above-noted inefficiencies of launching threads using the workgroup cluster architecture 300 of FIG. 3 are avoided. In particular, rather than WGPs 408 having to launch threads by submitting requests to the SPI 304 via the CP 306 and memory 310 as in FIG. 3, in the workgroup cluster architecture 400 of FIG. 4, the WGPs 408 are able to launch threads independently from or in coordination with the SPI 404 without having to wait for the SPI 404 to launch the thread and assign work and transfer related data 312 to an available WGP 408. Instead, in some implementations, the local launcher 112 either allocates resources directly, independently from the SPI 404, and notifies the SPI 404 of the obtained resources or requests allocation of resources directly from the SPI 404. In some implementations, a set of resources is dedicated to one or more WGP 408 by the SPI 404. In some implementations, one or more WGP 408 is dedicated to local launch functionality by the SPI 404.

By coordinating with the SPI to manage resources and launch shader threads, the local launcher 112 is able to expedite the execution of shader threads without needing to interface with system memory or communicate directly with the SPI. Accordingly, when a WGP 408 is in the process of executing a particular shader thread and needs to perform additional tasks such as further calculations or other work, the local launcher 112 accelerates the launching of a shader thread that performs the additional tasks by allowing the WGP 408 to launch the thread internally with low latency and without burdening limited system memory bandwidth. This can be particularly useful in machine learning implementations where many granular decisions or calculations determine how a particular procedure will execute and which sets of data the shader thread will need to utilize to do so.

In some implementations, the local launcher 112 coordinates with the SPI 404 by communicating a list of allocated resources directly to the SPI 404 or storing such a list in a cache or memory accessible by the SPI 404 such that the SPI 404 is able to monitor the allocated resources and avoid allocating those resources to other workgroups or workloads until the local launcher 112 releases the resources back to the SPI 404. Although the local launcher 112 coordinates with the SPI 404 in such implementations, it is able to do so indirectly in some implementations, e.g., through a cache, and therefore limits its overall resource usage. In other implementations, where the local launcher 112 launches threads independently from the SPI 404, the local launcher 112 does not communicate with the SPI 404 and instead the SPI 404 monitors the activities of the WGPs 408 and resources to identify resources that are in use by snooping the activity of the WGPs 408, e.g., by monitoring the performance or execution of the WGPs 408.

In some implementations, the SPI 404 leases the resources or provides resource credits, which may act to reserve or otherwise be associated with specific resources or portions of resources, to the local launcher 112 in response to a request to allocate resources received from the local launcher 112 and, when the local launcher 112 notifies the SPI 404 that a shader thread has completed execution, terminates the lease or adds the resource credits back to a global pool of resource credits managed by the SPI 404. In some implementations, the local launcher 112 does not need to communicate directly or in a low latency fashion with the SPI 404. As such, the local launcher 112 is able to operate more efficiently, improving overall performance and limiting the burden on memory bandwidth and other limited resources, such as the processing capabilities of the CP 306 or SPI 404. Generally, the time required to launch shader threads is minimized when the local launcher 112 launches threads independently from the SPI 404, while coordinating with the SPI 404 to manage resources or launch shader threads enables the SPI 404 to operate more efficiently. By allowing for software to decide the balance between shader thread launch latency and SPI 404 efficiency and latency, developers are able to capitalize on an appropriate balance to expedite execution of relatively more important work while allowing less important work to be deprioritized appropriately.

Figure 5:
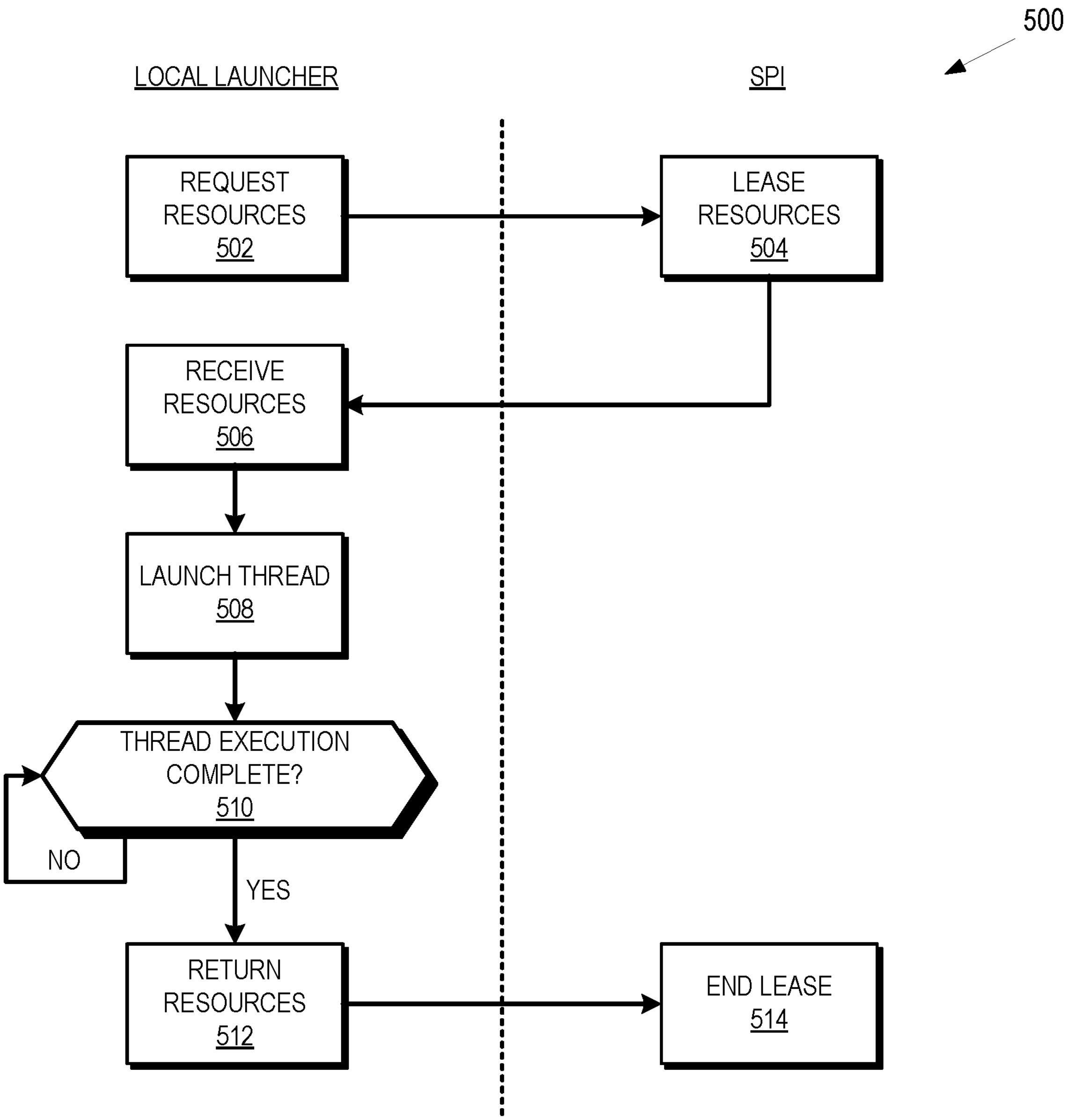
FIG. 5 is a data flow diagram of resource leasing by a shader program interface to a local launcher of a workgroup processor in a workgroup cluster according to some implementations.

FIG. 5 is a data flow diagram 500 of coordinated resource leasing by a shader program interface to a local launcher of a WGP in a workgroup cluster according to some implementations. The data flow diagram 500 is implemented in some implementations of the processing system 100 shown in FIG. 1, the graphics pipeline 200 shown in FIG. 2, and the workgroup cluster architecture 400 shown in FIG. 4. As shown in FIG. 5, at block 502, a local launcher such as one of the local launchers 112 of FIG. 4 requests resources from an SPI such as SPI 404 of FIG. 4. In response to the request, at block 504, the SPI leases the resources to the local launcher. After receiving the resources at block 506, the local launcher launches a set of shader threads (e.g., a workgroup), such as compute shader threads, at block 508. As shown at decision block 510, the resources are held captive by the local launcher until the thread execution is complete, and, at block 512, the local launcher returns the resources to the SPI, which ends the lease at block 514. In some implementations, rather than requesting and returning resources en masse, the local launcher requests and returns resources in a piecemeal fashion such that only the resources needed for a short-term window of operations are held captive by the local launcher and further resources are requested or directly allocated and unused resources are returned in a more granular fashion, e.g., not only prior to and after completion of a particular thread's execution.

Figure 6:
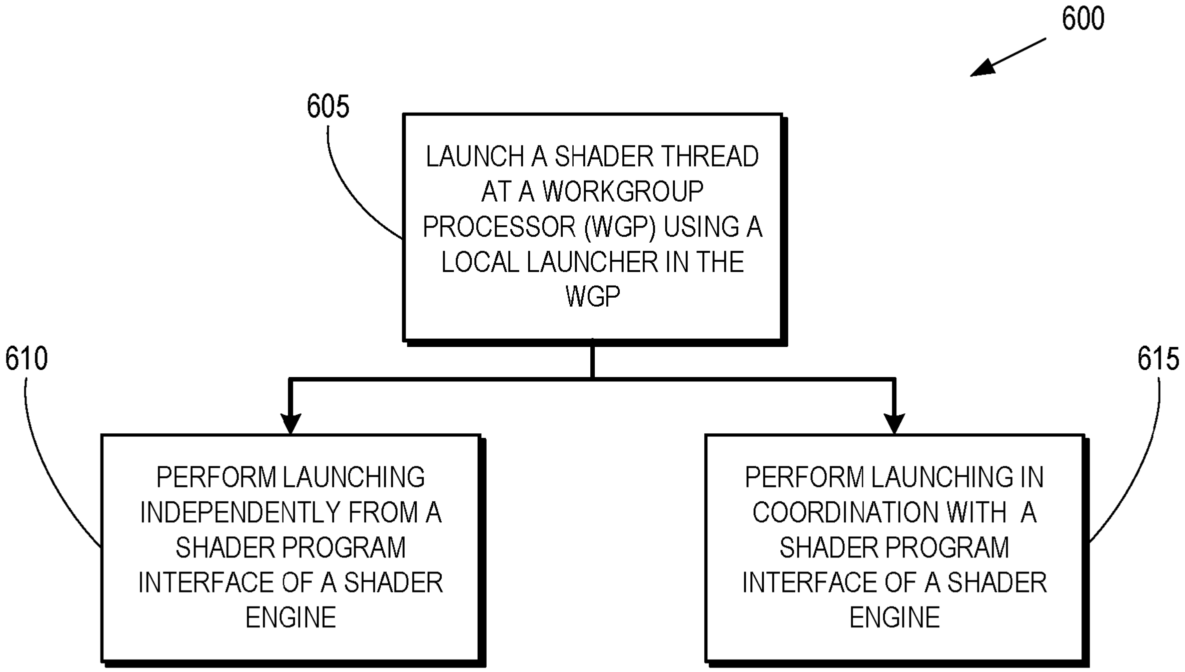
FIG. 6 is a flow diagram of a method of launching a shader thread at a workgroup processor in a workgroup cluster using a local launcher of the workgroup processor according to some implementations.

FIG. 6 is a flow diagram of a method 600 of launching a shader thread at a WGP in a workgroup cluster using a local launcher of the WGP according to some implementations. The method 600 is implemented in some implementations of the processing system 100 shown in FIG. 1, the graphics pipeline 200 shown in FIG. 2, and the workgroup cluster architecture 400 shown in FIG. 4. At block 605 of the method 600, a local launcher, such as one of the local launchers 112 of FIG. 4, launches a shader thread at a WGP, such as WGP 408-1, containing or otherwise associated with the local launcher 112.

In some implementations, the shader thread is launched in response to a determination at the WGP that additional work needs to be done or in response to an API call. At block 610, the local launcher launches a thread independently from an SPI, such as the SPI 404 of FIG. 4. Alternatively, at block 615, the local launcher launches a thread in coordination with an SPI. In order to allocate the resources needed to execute the thread, the local launcher allocates the resources either independently or in coordination with an SPI, such as the SPI 404 of FIG. 4, as described above in the discussion of FIGS. 4 and 5. In particular, the local launcher either obtains resources by requesting the resources from the SPI or by obtaining the resources independently from the SPI and optionally notifying the SPI of the obtained resources to assist the SPI in maintaining a global view of resource usage by the WGPs. Accordingly, various implementations disclosed herein enable a distributed control system for launching shader threads that does not create a bottleneck by relying on an SPI to launch every thread.

In some implementations, the apparatus and techniques described above are implemented in a system including one or more integrated circuit (IC) devices (also referred to as integrated circuit packages or microchips), such as the local launch functionality described above with reference to FIGS. 1, 2, and 4-6. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some implementations, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

One or more of the elements described above is circuitry designed and configured to perform the corresponding operations described above. Such circuitry, in at least some implementations, is any one of, or a combination of, a hardcoded circuit (e.g., a corresponding portion of an application specific integrated circuit (ASIC) or a set of logic gates, storage elements, and other components selected and arranged to execute the ascribed operations), a programmable circuit (e.g., a corresponding portion of a field programmable gate array (FPGA) or programmable logic device (PLD)), or one or more processors executing software instructions that cause the one or more processors to implement the ascribed actions. In some implementations, the circuitry for a particular element is selected, arranged, and configured by one or more computer-implemented design tools. For example, in some implementations the sequence of operations for a particular element is defined in a specified computer language, such as a register transfer language, and a computer-implemented design tool selects, configures, and arranges the circuitry based on the defined sequence of operations.

Within this disclosure, in some cases, different entities (which are variously referred to as "components," "units," "devices," "circuitry," "engines," "workgroups," "launchers," "interfaces," etc.) are described or claimed as "configured" to perform one or more tasks or operations. This formulation of "[entity] configured to [perform one or more tasks]" is used herein to refer to structure (e.g., a physical element, such as electronic circuitry, or an algorithm in software executed by such a physical element). More specifically, this formulation is used to indicate that this physical structure is arranged to perform the one or more tasks during operation. A structure can be said to be "configured to" perform some task even if the structure is not currently being operated. Thus, an entity described or recited as "configured to" perform some task refers to a physical element, such as a device, circuitry, memory storing program instructions executable to implement the task, or an algorithm executed using such a physical element. This phrase is not used herein to refer to something intangible. Further, the term "configured to" is not intended to mean "configurable to." An unprogrammed field programmable gate array, for example, would not be considered to be "configured to" perform some specific function, although it could be "configurable to" perform that function after programming. Additionally, reciting in the appended claims that a structure is "configured to" perform one or more tasks is expressly intended not to be interpreted as having means-plus-function elements.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. An apparatus comprising:

a shader engine comprising a plurality of workgroup processors configured to execute shader threads and a shader program interface (SPI) configured to assign the shader threads to execute at one or more of the workgroup processors; and a local launcher associated with a workgroup processor of the plurality of workgroup processors, wherein the local launcher is configured to assign a shader thread to execute at the workgroup processor and allocate one or more resources of the shader engine to the workgroup processor to launch the shader thread for execution, and wherein the local launcher is configured to perform the assigning and allocating in response to an application programming interface (API) call associated with utilizing the local launcher.

2. The apparatus of claim 1, wherein the local launcher is configured to launch the shader thread independently from the SPI.

3. The apparatus of claim 1, wherein the local launcher is configured to coordinate with the SPI to launch the shader thread.

4. The apparatus of claim 3, wherein the coordinating includes communicating with the SPI to allocate resources for the shader thread.

5. The apparatus of claim 4, wherein the local launcher obtains resources by requesting the resources from the SPI.

6. The apparatus of claim 4, wherein the local launcher obtains resources independently from the SPI.

7. The apparatus of claim 6, wherein the coordinating includes notifying the SPI of the obtained resources.

8. An apparatus comprising:

a shader engine comprising a plurality of workgroup processors configured to execute shader threads and a shader program interface (SPI) configured to assign the shader threads to execute at one or more of the workgroup processors; and a local launcher associated with a workgroup processor of the plurality of workgroup processors, wherein the local launcher is configured to perform one or more tasks in response to an application programming interface (API) call associated with utilizing the local launcher.

9. The apparatus of claim 8, wherein the local launcher obtains resources by requesting the resources from the SPI.

10. The apparatus of claim 9, wherein the SPI leases the resources to the local launcher in response to the request.

11. The apparatus of claim 10, wherein the local launcher notifies the SPI when the shader thread completes execution.

12. The apparatus of claim 11, wherein the SPI terminates the lease in response to the notification.

13. The apparatus of claim 8, wherein the local launcher obtains resources independently from the SPI.

14. The apparatus of claim 13, wherein the local launcher is configured to notify the SPI of the obtained resources.

15. A method comprising:

launching a shader thread at a workgroup processor of a shader engine using a local launcher associated with both the workgroup processor and a shader program interface (SPI) configured to assign shader threads to execute at the shader engine, wherein launching comprises assigning a shader thread to execute at the workgroup processor and allocating one or more resources of the shader engine to the workgroup processor, and wherein launching the shader thread using the local launcher is performed in response to an application programming interface (API) call associated with utilizing the local launcher.

16. The method of claim 15, wherein the launching is performed independently from the SPI.

17. The method of claim 15, wherein the launching is performed in coordination with the SPI.

18. The method of claim 17, wherein the local launcher communicates with the SPI to allocate resources for the shader thread.

19. The method of claim 18, wherein the launching includes obtaining resources by requesting the resources from the SPI.

20. The method of claim 18, wherein the launching includes obtaining resources independently from the SPI and notifying the SPI of the obtained resources.

* * * * *